United States Patent
Perrier et al.

(10) Patent No.: US 6,205,772 B1
(45) Date of Patent: Mar. 27, 2001

(54) EXTENDABLE DIVERGENT TAIL PIPE PROPULSION UNIT

(75) Inventors: Bruno Perrier, Le Bouscat; Jean-Luc Sans, Pessac; Alain Henault, St Aubin De Medoc, all of (FR)

(73) Assignee: Societe Nationale d'etude et de Construction de Motenrs d'Aviation, Paris (FR)

( * ) Notice: Subject to any disclaimer, the term of this patent is extended or adjusted under 35 U.S.C. 154(b) by 0 days.

(21) Appl. No.: 09/091,965
(22) PCT Filed: Dec. 27, 1996
(86) PCT No.: PCT/FR96/02093
  § 371 Date: Jun. 26, 1998
  § 102(e) Date: Jun. 26, 1998
(87) PCT Pub. No.: WO97/24521
  PCT Pub. Date: Jul. 10, 1997

(30) Foreign Application Priority Data

Dec. 28, 1995 (FR) .................................................. 95 15634

(51) Int. Cl.[7] ...................................................... F02K 1/09
(52) U.S. Cl. ........................................ 60/271; 239/265.11
(58) Field of Search ........................ 60/271; 239/265.11, 239/265.33

(56) References Cited

U.S. PATENT DOCUMENTS

| 3,526,365 | 9/1970 | Paine . |
| 3,561,679 | 2/1971 | Lager . |
| 4,169,555 | * 10/1979 | Crowe ............................. 239/265.33 |
| 4,676,436 | * 6/1987 | Willis .............................. 239/265.33 |
| 5,282,576 | 2/1994 | Chatenet et al. . |

FOREIGN PATENT DOCUMENTS

| 2 622 931 | 5/1989 | (FR) . |
| 2 029 511 | 3/1980 | (GB) . |

* cited by examiner

Primary Examiner—Louis J. Casaregola
(74) Attorney, Agent, or Firm—Weingarten, Schurgin, Gagnebin & Hayes LLP

(57) ABSTRACT

The deployable diverging part comprises a first portion (20) having an upstream end connected to the end wall (14) of the thruster, a ring-shaped second portion (22) that is movable between a retracted position and a deployed position in which it connects to the downstream end of the first portion (20) to extend it, and a deployment mechanism comprising a plurality of hinged arms (30). Means (50, 52) are provided in distributed manner at the periphery of the downstream end of the first portion and at the periphery of the upstream end of the ring to enable the ring (22) to be locked onto the downstream end of the first portion (20) when the ring is in its deployed position, and the deployment mechanism comprises at least four arms (30) co-operating with the ring (22) to form a hyperstatic assembly so that the ring can be displaced without significant deformation so as to be brought into the desired position to lock automatically and completely on the first portion (20) when it is deployed.

11 Claims, 5 Drawing Sheets

EXTENDABLE DIVERGENT TAIL PIPE PROPULSION UNIT

The present invention relates to a deployable diverging part of a thruster.

The thrust from a thruster depends on the rate at which gas is ejected and on the speed at which it is ejected. To optimize the speed parameter, it is necessary to have a diverging part with an outlet that is of large diameter, particularly for a second or third stage of a multistage thruster. This leads to diverging parts that are long, which is often difficult to make compatible with the space available. One solution consists in designing a diverging part that is deployable, which is of shorter length in its initial configuration and which can be lengthened by putting one or more rings of the diverging part into place.

Deployable diverging parts are also used to match the outlet section of thruster nozzles to ambient pressure, which pressure decreases from low altitudes close to the ground to high altitudes, such that as close as possible an approximation to optimum thrust is always obtained in spite of changing altitude.

In all these cases, it must be possible to deploy the deployable portion of the diverging part in a manner that is automatic and reliable, while expending a minimum amount of energy.

Various types of deployment mechanism have been proposed for deployable diverging parts, in particular mechanisms making use of cables, of roller screws, of ball screws, of beams that can be rolled out, or of a membrane. Overall, those mechanisms are relatively bulky and give rise to a very large mass penalty, particularly for diverging parts of large diameter.

A deployment mechanism that does not present those drawbacks has already been proposed in the Applicant's U.S. Pat. No. 5,282,576. The diverging part comprises a first portion whose upstream end is connected to the end wall of the thruster and a second portion in the form of a ring that is movable between a retracted position in which it surrounds the first portion of the diverging part, and a deployed position in which it is connected to the downstream end of the first portion to extend it. The deployment mechanism comprises hinged arms each having one end connected to the ring of the diverging part, and means for actuating the arms enabling the ring of the diverging part to be displaced from its retracted position to its deployed position.

It is necessary to lock the ring of the diverging part in its deployed position in order to prevent it from returning towards its retracted position under thrust from the jet passing through it. In U.S. Pat. No. 5,282,576, that locking is achieved by an over-center or "toggle" action of the arms so as to avoid leaving the actuator means continuously active after deployment, with the operation of the deployment mechanism being reversible.

An object of the present invention is to provide a deployable diverging part of the same type as U.S. Pat. No. 5,282,576, but in which the ring is locked in the deployed position in a manner that is reliable, without requiring any special geometrical configuration for the arms, and with the deployment mechanism not being designed to be reversible.

This object is achieved by the facts that:
  means are provided in distributed manner at the periphery of the downstream end of the first portion and at the periphery of the upstream end of the ring so as to enable the ring to be locked onto the downstream end of the first portion when the ring is in its deployed position; and
  the deployment mechanism comprises at least four arms co-operating with the ring to form a hyperstatic assembly so that the ring can be moved without significant deformation so as to be brought to the desired position for locking automatically and completely to the first portion when it is deployed.

The deployable diverging part of the invention is thus remarkable in its combination of automatic locking of the ring of the diverging part on the first portion thereof by locking means that are distributed around their periphery, and by the hyperstatic nature of the moving assembly which makes it possible to guide the ring of the diverging part accurately to the exact deployed position required for locking to take place automatically.

Advantageously, the locking means comprise a plurality of flexible tongues co-operating with one or more corresponding recesses so as to snap into the recess(es) when the ring reaches its deployed position.

Also advantageously, releasable locking means are provided to lock the ring in its retracted position.

The invention will be better understood on reading the following description given by way of non-limiting indication and with reference to the accompanying drawings, in which.

Figure 1:
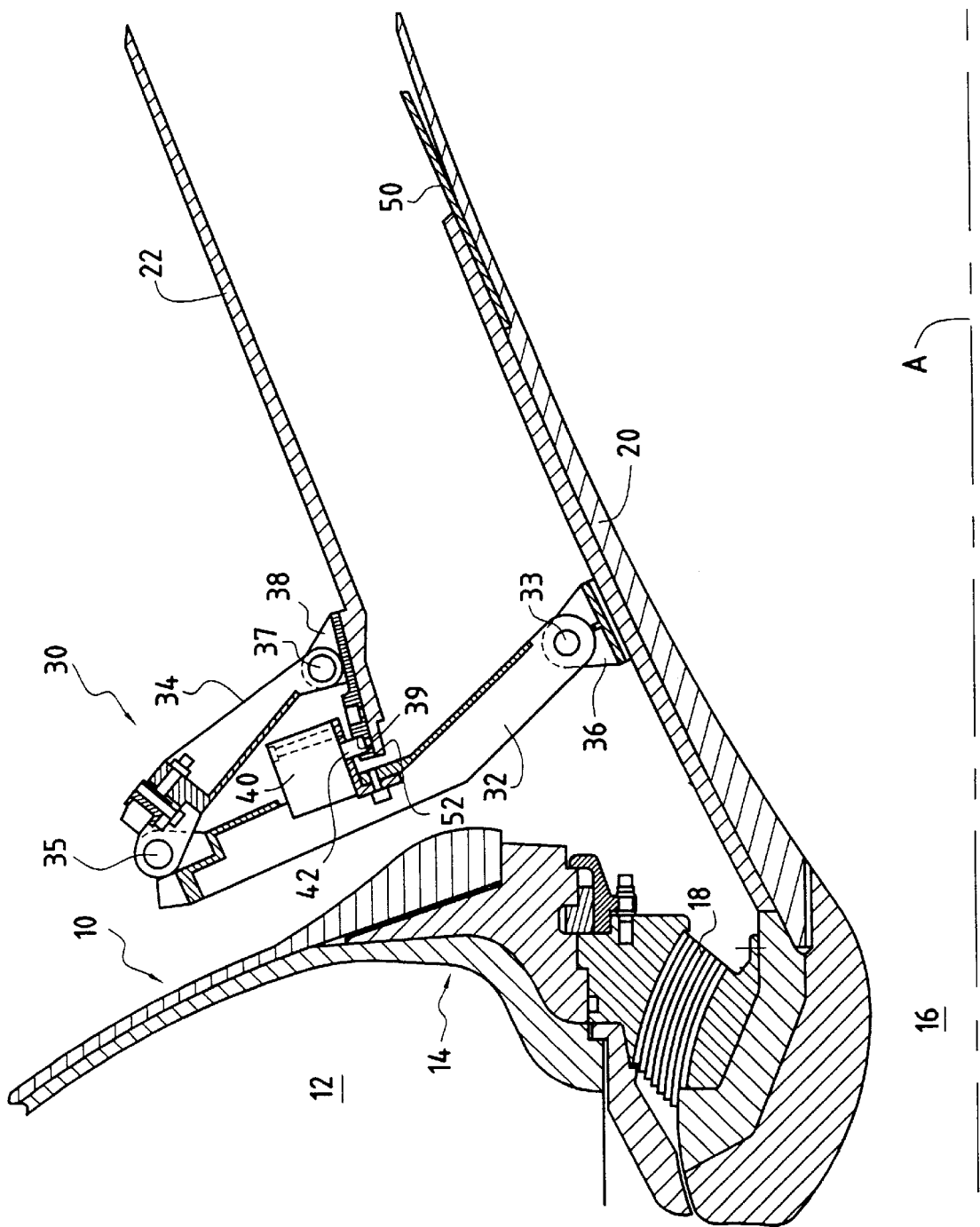
FIG. 1 is a diagrammatic half-view in section showing a first embodiment of a deployable diverging part of the invention, with the ring of the diverging part in the retracted position.
Figure 2:
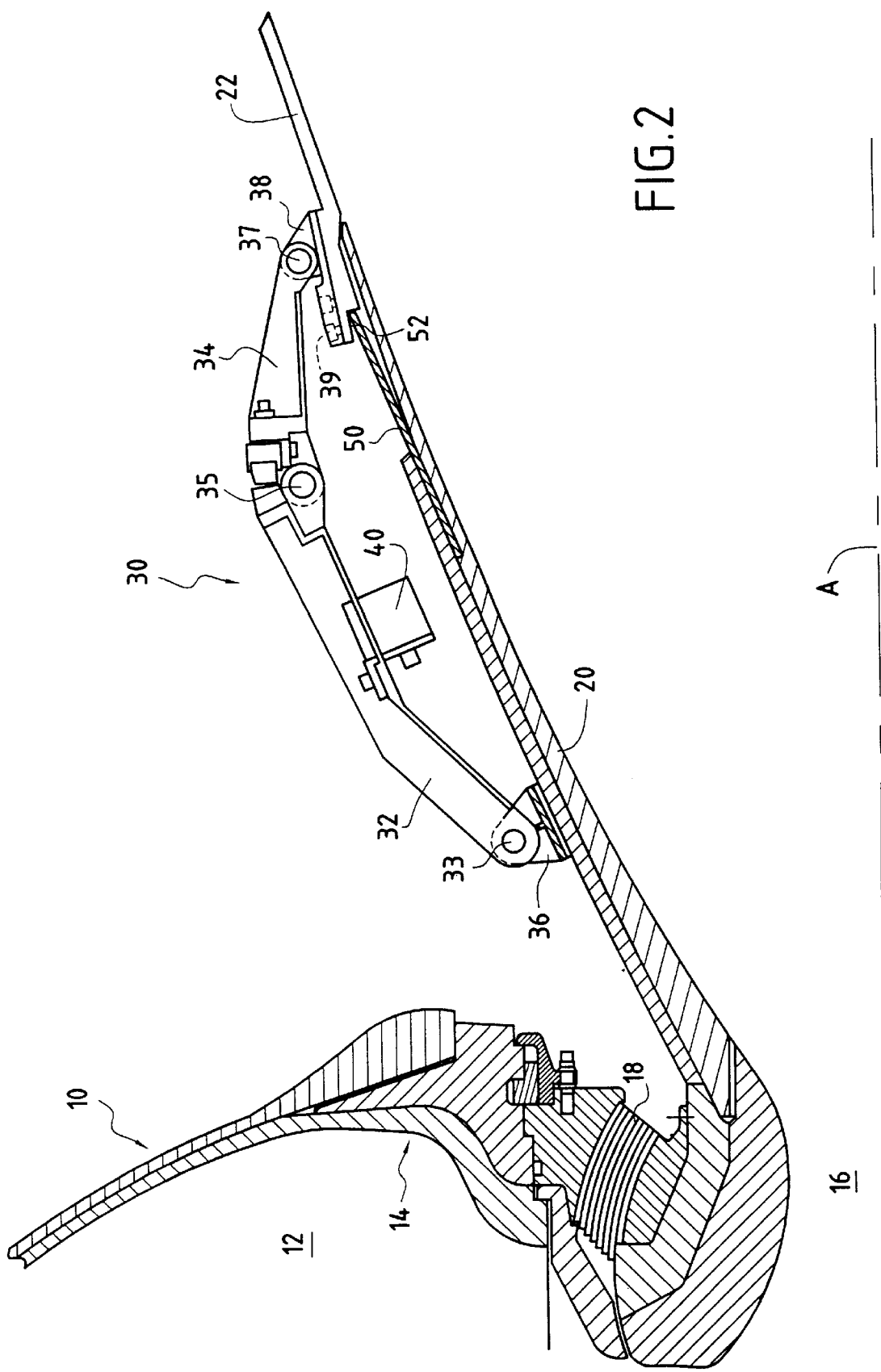
FIG. 2 is a half-view in section similar to FIG. 1, but with the ring of the diverging part in the deployed position.

In FIGS. 1 and 2, reference 10 designates a thruster body, e.g. a solid propellant thruster whose combustion chamber 12 opens out through the end wall 14 of the thruster via a nozzle throat 16 which is extended by a first portion 20 of a deployable diverging part.

The upstream end of the portion 20 of the diverging part ("upstream" in the gas flow direction) and the nozzle throat 16 are connected to the end wall 14 of the thruster by means of a cone when the nozzle is fixed, or by means of a flexible abutment 18 when the nozzle is articulated as in the case shown. By way of example, the abutment may be spherical and constituted, in conventional manner, by alternating layers of metal or composite material and of elastomer bonded thereto.

The body and the end wall of the thruster, and also the nozzle throat and the portion 20 of the diverging part are normally internally coated with thermal protection material that ablates.

The deployable diverging part also comprises a ring 22 which, in the retracted position (FIG. 1) surrounds the portion 20, being coaxial thereabout, and in the deployed position (FIG. 2) connects to the downstream end of the portion 20 and extends it so as to form a diverging part having an enlarged outlet diameter.

The ring 22 is held in the retracted position and is guided towards the deployed position by means of four hinged arms 30 that are uniformly distributed around the first portion 20 of the diverging part.

Each arm (FIGS. 1, 2, 3) comprises a first segment 32 hinged at a first end to a lug 36 fixed to the outside wall of the first portion 20 of the diverging part (about an axis 33) and at a second end to a first end of a second segment 34 (about an axis 35). At its second end, the segment 34 is hinged to a lug 38 fixed to the outside wall of the ring (about an axis 37). Each arm segment 32, 34 is made up of two parallel flanks respectively referenced 32a, 32b, and 34a, 34b. The plane of symmetry P (FIG. 3) of each arm contains the axis A of the diverging part, with the hinge axes 33, 35 and 37 at the ends of the segments 32 and 34 being perpendicular to the plane P and to the axis A. As shown in FIG. 1, a device for locking the arm in its retracted position comprises an abutment 40 secured to the segment 32 and provided with a stud 42 which penetrates into a recess 39 in the lug 38. The stud 42 can be disengaged from the recess 39 to release the arm 30 by pneumatic means, e.g. by connecting the stud to the piston of a pneumatic actuator, or by pyrotechnic means. There is no need to provide a locking device on each arm 30, locking only one arm can suffice to hold the assembly in the retracted position.

When the arm 30 is released, it can deploy, with its segments 32 and 34 rotating about their end hinge axes. While the arm is deploying, the position of the plane of symmetry P remains unchanged.

Figure 3:
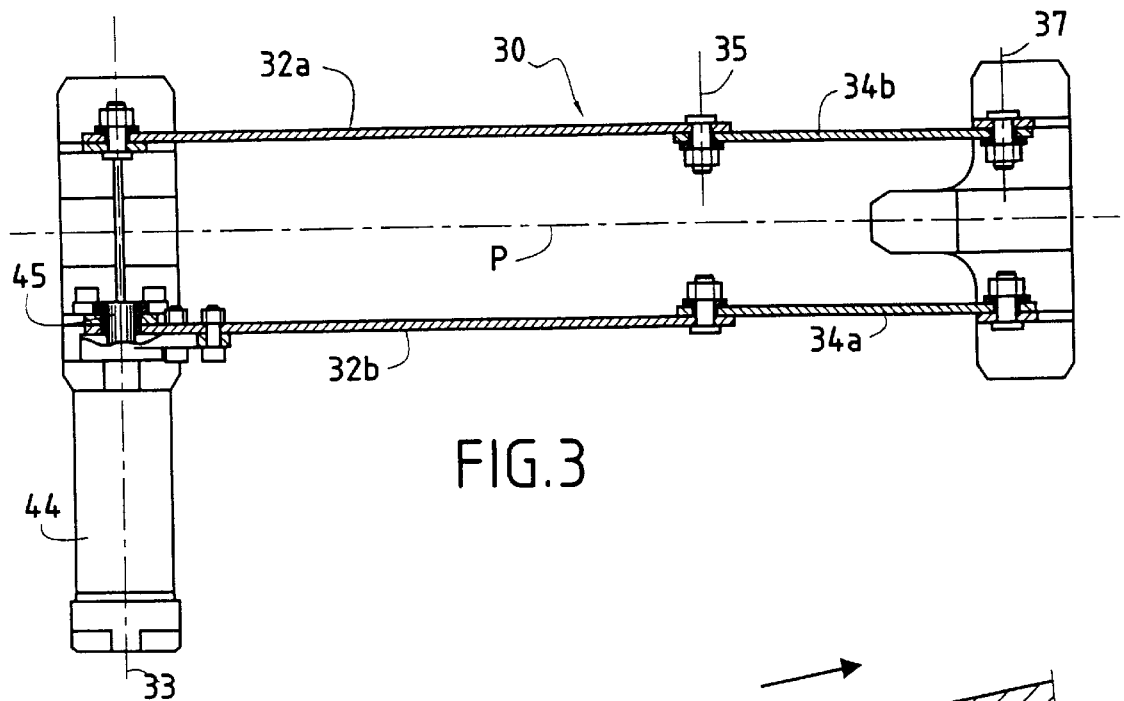
FIG. 3 is a plan view of an arm of the deployment mechanism of FIGS. 1 and 2.

In the example of FIGS. 1 to 3, the arm 30 is deployed by means of a torsion spring 44 mounted on the hinge axis 33. The spring 44 drives a fluted outlet shaft 45 engaged with the segment 32.

To deploy the ring 22 of the diverging part, all four arms 30 are released simultaneously by unlocking the studs 42. When released in this way, the springs 44 cause the arm segments 32 to pivot simultaneously, thereby deploying the arms simultaneously.

It will be observed that the assembly constituted by the four arms 30 and the ring 22 is hyperstatic, which means that the ring 22 moves without deforming and remains constantly centered on the axis A. The hyperstatic nature of the assembly thus makes it possible to provide accurate guidance of the ring 22 towards its deployed position, and the arms are prevented from moving in non-synchronous manner. It will be observed that this result can still be obtained-if a torsion spring is mounted on only some of the arms, or indeed on only one arm. In this case, the hyperstatic nature comes from the fact that four arms 30 are provided. The number of arms could be greater than four, but that would increase the mass of the mechanism without providing any real additional advantage.

According to a feature of the deployable diverging part of the invention, means are provided at the periphery of the downstream end of the portion 20 and at the periphery of the upstream end of the ring 22 to provide mutual locking when the ring reaches its deployed position.

In the example shown (FIGS. 1, 2, 4, and 5), these locking means are constituted by a plurality of flexible tongues 50 fixed to the periphery of the downstream end of the portion 20, on the outside thereof, and by an annular setback 52 formed at the upstream end of the ring 22, on the inside thereof.

Figure 4:
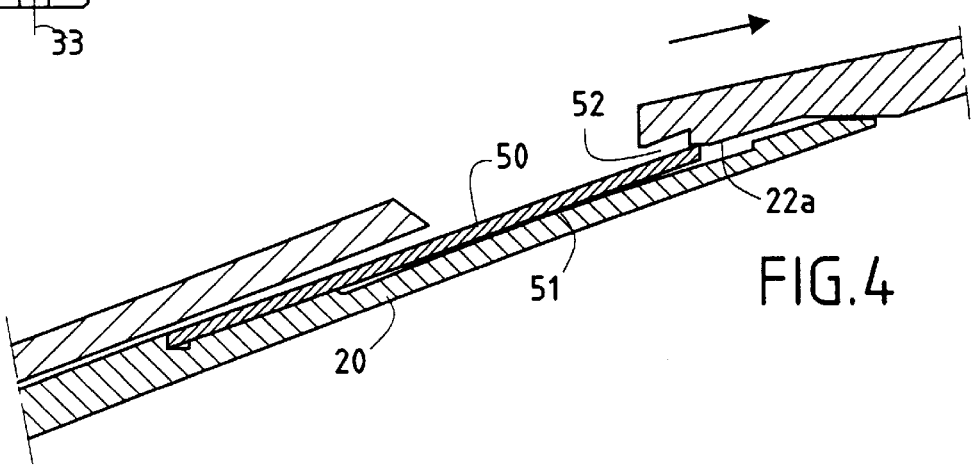
FIG. 4 is a detail view showing the locking means in the deployable diverging part of FIGS. 1 and 2 for locking the ring of the diverging part on the first portion thereof, said locking means being shown immediately before locking.

When the ring 22 comes close to its fully deployed position, the inside wall 22a of the ring 22 presses against the tongues 50, causing them to be deflected towards the axis of the diverging part (FIG. 4). To this end, each tongue 50 leaves a gap 51 between its free end and the outside wall of the portion 20.

Figure 5:
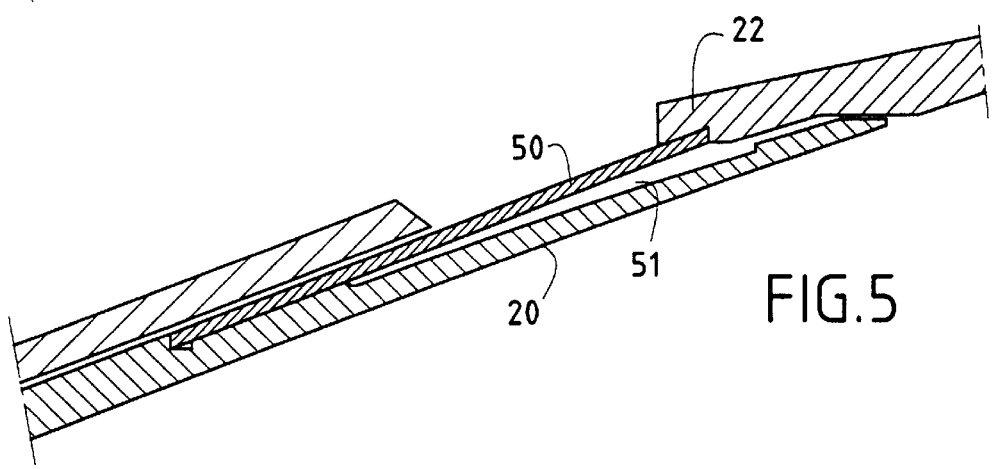
FIG. 5 is a detail view similar to FIG. 4, but after locking.

The position of the tongues 50 and the position of the setback 52 are determined so that the tongues snap into the setback 52 when the ring 22 reaches the deployed position (FIG. 5). This ensures that the ring 22 is locked onto the portion 20. It will be observed that the accuracy provided by the hyperstatic assembly makes this kind of automatic locking possible. It will also be observed that the setback 52 could be replaced by a plurality of recesses corresponding to the tongues.

In the embodiment of FIGS. 1 to 3, the arms are deployed by one or more torsion springs. This solution is suitable when the diverging part is deployed before the thruster is ignited, however the force developed by the spring(s) would normally be insufficient to overcome the pressure of the gas jet if deployment were to be performed after ignition.

Figure 6:
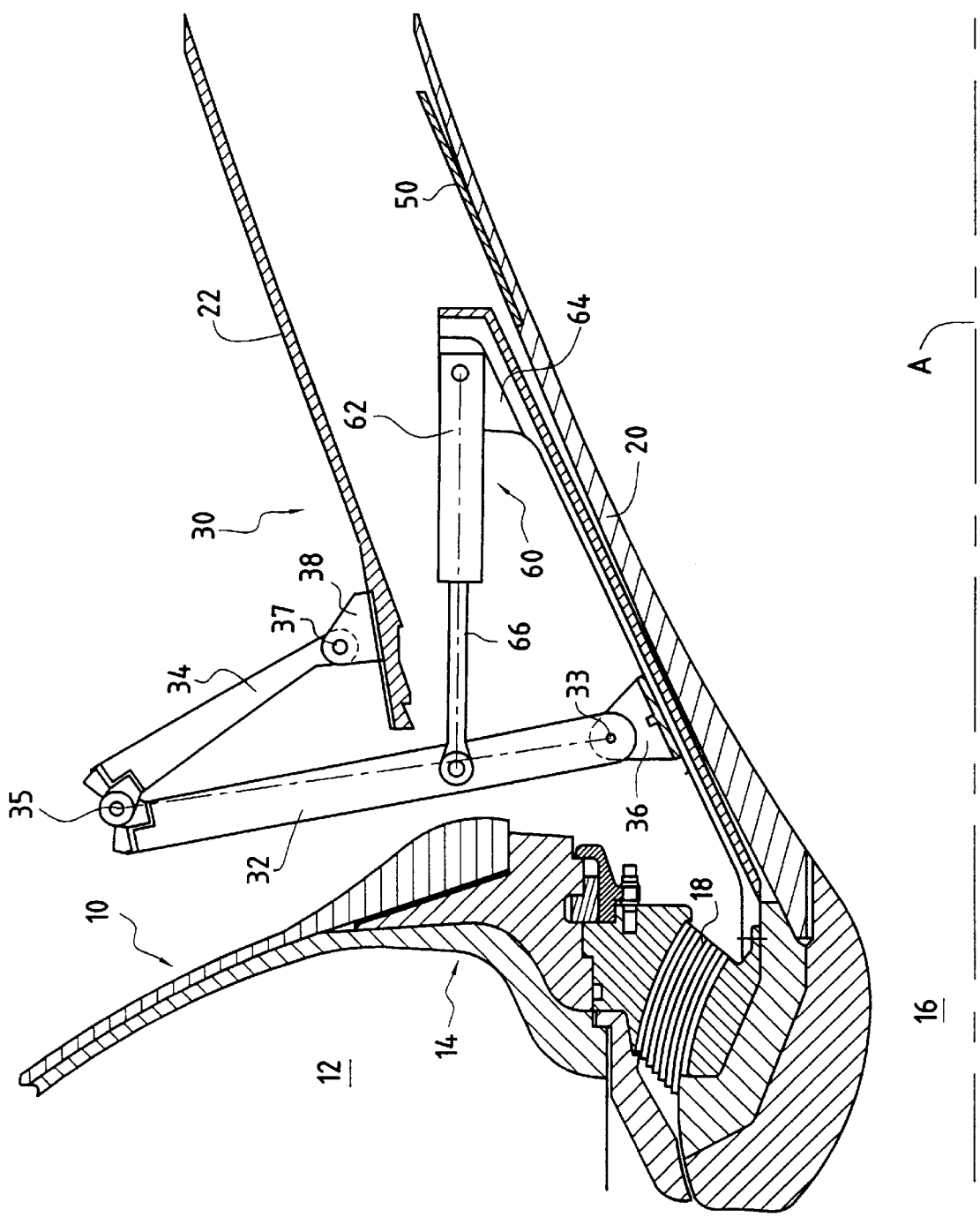
FIG. 6 is a diagrammatic half-view in section showing a second embodiment of a deployable diverging part of the invention, with the ring of the diverging part in the retracted position.
Figure 7:
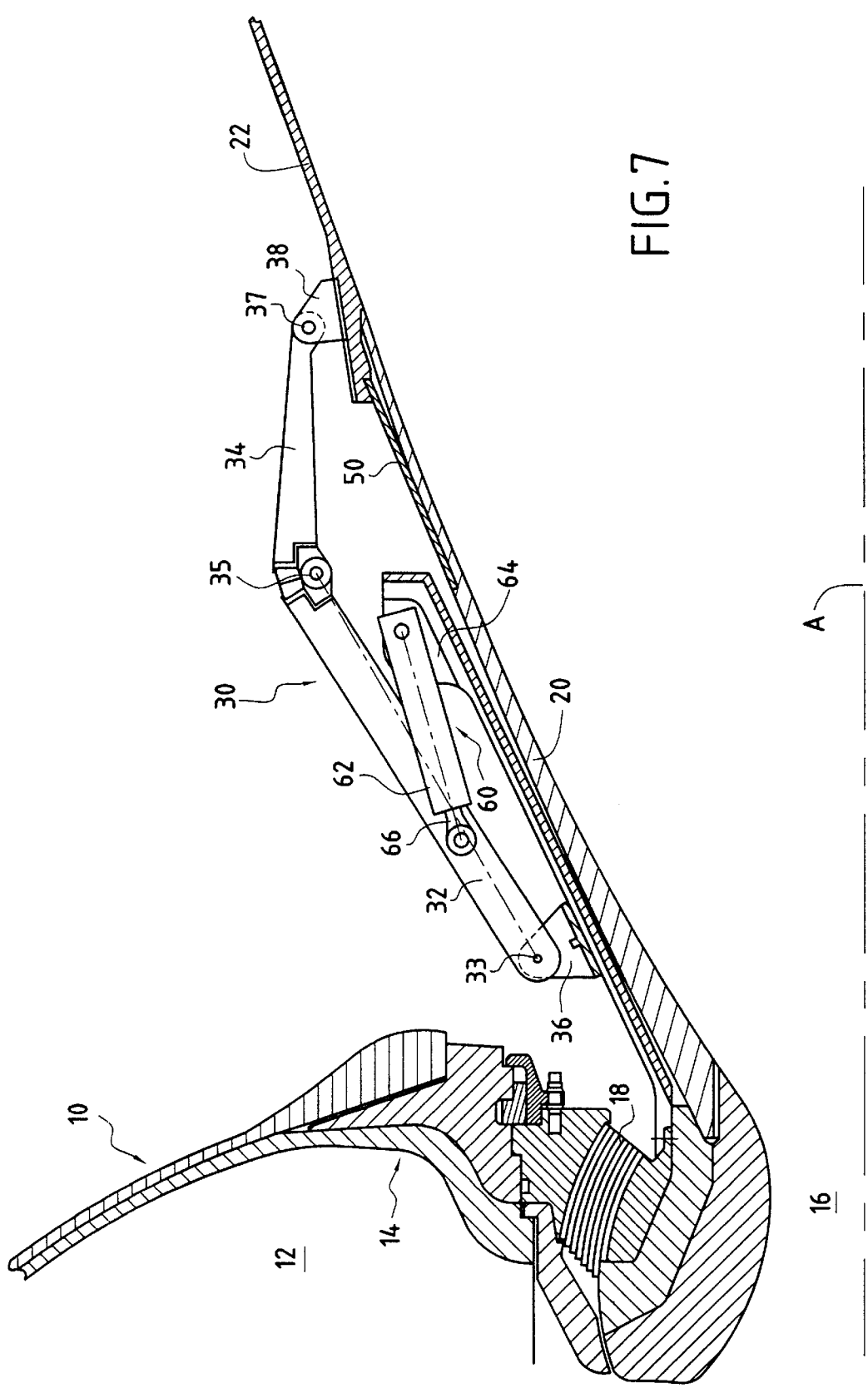
FIG. 7 a half-view in section similar to FIG. 1, but with the ring of the diverging part in the deployed position.

An embodiment that is suitable for deployment after the thruster has been ignited is shown in FIGS. 6 and 7.

In this second embodiment, the portions of the diverging part which correspond to portions of the embodiment shown in FIGS. 1 to 5 are given the same references and are not described again.

As can be seen in FIGS. 6 and 7, the arm 30 is held in the retracted state and it is deployed by means of at least one actuator 60 whose cylinder 62 is hinged to a lug 64 fixed to the outside wall of the portion 20 and whose rod 66 is hinged at its end to the segment 32 of the arm 30. There is no need to provide a device for locking the arm 30 in the retracted position.

The actuator 60 may be of pneumatic or hydraulic type. It is possible to provide a single actuator, with simultaneous displacement of the other arms being ensured by the hyperstatic assembly, or else to provide a plurality of arms with respective actuators. The ring 22 is locked on the portion 20 in the same manner as that described with reference to FIGS. 4 and 5.

Other means may be provided for driving the deployment means when deployment is to be performed after ignition. For example, it will be possible to replace the torsion springs of the embodiment of FIGS. 1 to 3 by one or more motors. In addition, it is naturally possible to provide actuator or motor-driven drive even when deployment is performed before ignition. It is also possible to envisage driving deployment by pyrotechnic means.

Finally, it should be observed that the locking by means of tongues and a setback as shown in FIGS. 4 and 5 could easily be replaced by any other known means enabling locking or snap-fastening to be achieved automatically.

What is claimed is:

1. A deployable diverging part for a thruster, the diverging part comprising:

a first portion having an upstream end connected to the end wall of the thruster;

a second portion in the form of a ring that is moveable between a retracted position in which it surrounds the first portion and a deployed position in which it is connected to the downstream end of the first portion so as to extend it; and a deployment mechanism comprising at least four hinged arms each having one end connected to the ring, and at least one arm having an arm-driving means enabling the ring to be moved from its retracted position to its deployed position;

means are provided in distributed manner at the periphery of the downstream end of the first position and at the periphery of the upstream end of the ring so as to enable the ring to be locked onto the downstream end of the first portion when the ring is in its deployed position; and the at least four hinged arms co-operating with the ring to form a hyperstatic assembly, wherein the at least four hinged arms move in a substantially synchronous manner so that the ring can be moved without significant deformation so as to be brought to the desired position for locking automatically and completely to the first portion when it is deployed.

2. A diverging part according to claim 1, characterized in that the locking means comprise a plurality of flexible tongues disposed on said first portion co-operating with one or more corresponding recesses disposed on said second portion so as to snap into the recesses when the ring reaches its deployed position.

3. A diverging part according to claim 1, characterized in that releasable locking means are provided to lock the ring in its retracted position.

4. A diverging part according to claim 3, in which each of the at least four hinged arms comprises a plurality of hinged segments characterized in that the locking means are organized to prevent a segment of at least one of the arms from moving relative to another segment of the same arm.

5. A diverging part according to claim 1, characterized in that the at least four hinged arms are moved into the deployed position by drive means mounted on a hinge of at least one of the at least four hinged arms.

6. A diverging part according to claim 5, characterized in that the drive means are constituted by a torsion spring.

7. A diverging part according to claim 1, characterized in the at least four hinged arms are moved into the deployed position by drive means acting on a segment of at least one of the at least four hinged arms.

8. A diverging part according to claim 7, characterized in that the at least four hinged arms are moved into the deployed position by means of at least one actuator mounted between the first portion and a segment of one of the at least four hinged arms.

9. A diverging part according to claim 2, characterized in that releasable locking means are provided to lock the ring in its retracted position.

10. A diverging part according to claim 4, characterized in that the at least four hinged arms are moved into the deployed position by drive means mounted on a hinge of at least one of the at least four hinged arms; and the drive means are constituted by a torsion spring.

11. A diverging part according to claim 4, characterized in that the at least four hinged arms are moved into the deployed position by drive means acting on a segment of at least one of the arms by means of at least one actuator mounted between the first portion and a segment of one of the at least four hinged arms.

* * * * *

UNITED STATES PATENT AND TRADEMARK OFFICE
CERTIFICATE OF CORRECTION

PATENT NO. : 6,205,772 B1
DATED : March 27, 2001
INVENTOR(S) : Bruno Perrier et al.

It is certified that error appears in the above-identified patent and that said Letters Patent is hereby corrected as shown below:

<u>Title page,</u>
Item [73], Assignee, "Motenrs" should read -- Moteurs --.

Signed and Sealed this

Fourth Day of June, 2002

Attest:

JAMES E. ROGAN
Attesting Officer
Director of the United States Patent and Trademark Office